No. 717,781. PATENTED JAN. 6, 1903.
J. TIMMS.
CAR TRUCK.
APPLICATION FILED MAY 8, 1902.
NO MODEL.

WITNESSES
E. J. Nottingham
H. Nottingham

INVENTOR
James Timms
By H. A. Seymour,
Attorney

UNITED STATES PATENT OFFICE.

JAMES TIMMS, OF COLUMBUS, OHIO, ASSIGNOR TO THE BUCKEYE MALLEABLE IRON AND COUPLER COMPANY.

CAR-TRUCK.

SPECIFICATION forming part of Letters Patent No. 717,781, dated January 6, 1903.

Application filed May 8, 1902. Serial No. 106,469. (No model.)

*To all whom it may concern:*

Be it known that I, JAMES TIMMS, a resident of Columbus, in the county of Franklin and State of Ohio, have invented certain new and useful Improvements in Car-Trucks; and I do hereby declare the following to be a full, clear, and exact description of the invention, such as will enable others skilled in the art to which it appertains to make and use the same.

My invention relates to an improvement in car-trucks, the object of the invention being to dispense with the necessity for a truck-bolster and support the body-transom directly upon springs with interposed side bearings and so construct the truck as to permit of the desired amount of pivotal and rolling motion.

With this object in view the invention consists in certain novel features of construction and combinations and arrangements of parts, as will be more fully hereinafter described, and pointed out in the claims.

Figure 1:
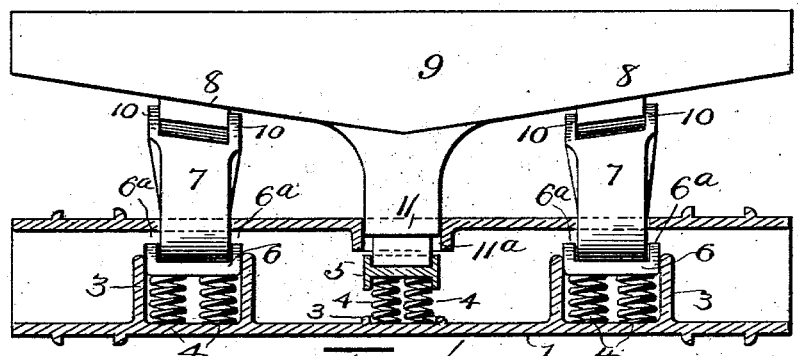
Figure 2:
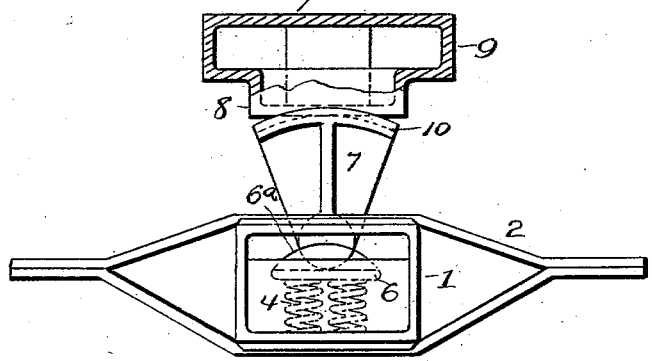
Figure 3:
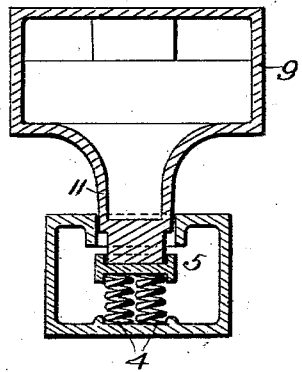

In the accompanying drawings, Figure 1 is a view, partly in section, illustrating my improvements. Fig. 2 is an end vertical transverse sectional view through the center of Fig. 1.

1 represents the truck-transom, which connects the side frames 2 of the truck and is preferably made hollow and of general rectangular shape, as shown. The truck-transom 1 is preferably open at its ends, made with numerous perforations to lighten the construction, and is provided at its center and near its ends on its lower member with pockets 3 for coiled springs 4. Four springs are shown in each pocket, (but it is to be understood that the number of springs can be varied at will,) and said springs are surmounted by caps 5 and 6, the caps 6 at each end being made with side flanges 6ª to prevent displacement of side bearings 7, supported thereon. These side bearings 7 are widest at their upper ends and are rounded at both ends, the lower rounded ends resting on caps 6 and the upper rounded ends supporting flat bearings 8 on the body-transom 9 and are made with flanges 10 at each side to prevent displacement of the parts.

The body-transom 9 is provided with a central depending tongue 11, extending through a flanged opening 11ª in the upper member of truck-transom 1 and resting on cap 5, which latter is made circular and flanged on its upper and lower faces to prevent its accidental removal.

It will thus be seen that with my improved construction above described the tongue 11 and side bearings 7 extend through the upper member of truck-transom 1 and prevent independent lateral or longitudinal movement of the transoms, but permit of slight pivotal and rolling motion to compensate for turning curves and the like.

A great many slight changes might be made in the general form and arrangement of the parts described without departing from my invention, and hence I do not wish to be limited to the precise construction set forth, but consider myself at liberty to make such slight changes and alterations as fairly fall within the spirit and scope of my invention.

Having fully described my invention, what I claim as new, and desire to secure by Letters Patent, is—

1. The combination of a truck-transom carrying center and end springs, a body-transom having a depending central portion resting on the central spring, the lower end of the depending portion being in a plane below the top of the truck-transom, and side bearings resting on the end springs and having rocking engagement with the body-transom.

2. The combination with a truck-transom and center and end springs therein, of a body-transom having a central depending projection which passes through the top of the truck-transom and rests on the central spring therein and side bearings also passing through the top of the truck-transom and having rocking engagement at their upper ends with the body-transom.

3. The combination with a truck-transom having central and side springs therein, of caps on said springs, a body-transom, a central depending circular tongue on the body-transom projecting into the truck-transom and supported on the central cap and side bearings interposed between the end caps and body-transom and rounded at both ends.

4. The combination of a hollow rectangular truck-transom having central and side springs therein, of caps on said springs, a body-transom, a central depending circular tongue on the body-transom projecting through a circular opening in the top of the truck-transom and supported to rotate on the central cap, and side bearings projecting through openings in the truck-transom and supported on the end caps and supporting the ends of the body-transom.

In testimony whereof I have signed this specification in the presence of two subscribing witnesses.

JAMES TIMMS.

Witnesses:
HARRY WRIGHT,
ARNO EBERLEIN.